United States Patent
Yamataka et al.

(10) Patent No.: US 10,417,512 B2
(45) Date of Patent: Sep. 17, 2019

(54) DRIVER ABNORMALITY DETECTION DEVICE AND DRIVER ABNORMALITY DETECTION METHOD

(71) Applicant: DENSO CORPORATION, Kariya, Aichi-pref. (JP)

(72) Inventors: Minori Yamataka, Kariya (JP); Takeshi Enya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/741,889

(22) PCT Filed: Jul. 1, 2016

(86) PCT No.: PCT/JP2016/069610
§ 371 (c)(1),
(2) Date: Jan. 4, 2018

(87) PCT Pub. No.: WO2017/006853
PCT Pub. Date: Jan. 12, 2017

(65) Prior Publication Data
US 2018/0197030 A1 Jul. 12, 2018

(30) Foreign Application Priority Data
Jul. 6, 2015 (JP) .................... 2015-135439

(51) Int. Cl.
*G06F 3/01* (2006.01)
*G06K 9/00* (2006.01)
(Continued)

(52) U.S. Cl.
CPC ......... *G06K 9/00845* (2013.01); *B60W 40/08* (2013.01); *B60W 50/14* (2013.01);
(Continued)

(58) Field of Classification Search
None
See application file for complete search history.

(56) References Cited

U.S. PATENT DOCUMENTS 7,421,334 B2 * 9/2008 Dahlgren ............... G07C 5/008
340/989
7,884,705 B2 * 2/2011 Nishimura ......... G06K 9/00845
180/272
(Continued)

FOREIGN PATENT DOCUMENTS

JP H07-096768 4/1995
JP 2001-138767 A 5/2001
(Continued)

OTHER PUBLICATIONS

Understanding Higher Cognitive Processes From Eye Movement Analysis, Cognitive Studies, 9 (4), 565-579. (Dec. 2002).
(Continued)

*Primary Examiner* — Steven Lim
*Assistant Examiner* — Muhammad Adnan
(74) *Attorney, Agent, or Firm* — Knobbe, Martens, Olson & Bear, LLP

(57) ABSTRACT

Provided is at least two of a direction determination unit which determines that the state is abnormal when a gaze direction of a driver of a vehicle is not within a first predetermined range based on a captured image of a head of the driver, a height determination unit which determines that the state is abnormal when a height of an eye of the driver is not within a second predetermined range based on the captured image, and a position determination unit which determines that the state is abnormal when a position of the head in a lateral direction is not within a third predetermined range based on the captured image; and an abnormal state determination unit which determines whether the state of the
(Continued)

driver is abnormal based on the determination results of the determination units.

6 Claims, 4 Drawing Sheets

(51) Int. Cl.
*B60W 40/08* (2012.01)
*B60W 50/14* (2012.01)
*G08G 1/16* (2006.01)
*B60K 28/06* (2006.01)

(52) U.S. Cl.
CPC ............. *G06F 3/012* (2013.01); *G06F 3/013* (2013.01); *G06K 9/00597* (2013.01); *G08G 1/16* (2013.01); *B60K 28/066* (2013.01); *B60W 2040/0818* (2013.01); *B60W 2040/0872* (2013.01); *B60W 2050/143* (2013.01); *B60W 2420/42* (2013.01); *G06F 2203/011* (2013.01)

(56) References Cited

U.S. PATENT DOCUMENTS

| | | | |
|---|---|---|---|
| 8,676,431 B1* | 3/2014 | Mariet | B60T 7/22 701/28 |
| 8,866,736 B2* | 10/2014 | Inada | A61B 3/113 345/156 |
| 9,165,477 B2* | 10/2015 | Wilson | G08G 1/0112 |
| 9,248,796 B2* | 2/2016 | Takahashi | B60R 21/00 |
| 9,547,798 B2* | 1/2017 | Plummer | G06K 9/00845 |
| 9,864,918 B2* | 1/2018 | Micks | G06T 7/20 |
| 9,868,396 B2* | 1/2018 | Watanabe | B62D 15/0295 |
| 9,873,437 B2* | 1/2018 | Fung | B60W 40/08 |
| 10,013,878 B2* | 7/2018 | Ricci | H04W 4/21 |
| 10,055,650 B2* | 8/2018 | Yi | G06K 9/00798 |
| 2006/0291223 A1* | 12/2006 | Scharenbroch | B60R 21/01534 362/484 |
| 2007/0186121 A1 | 8/2007 | Yasuo | |
| 2007/0230797 A1 | 10/2007 | Hisanaga | |
| 2008/0080741 A1 | 4/2008 | Yokoo et al. | |
| 2009/0022368 A1 | 1/2009 | Matsuoka | B60K 35/00 382/103 |
| 2014/0211319 A1* | 7/2014 | Park | G02B 27/01 359/630 |
| 2015/0294169 A1* | 10/2015 | Zhou | A61B 5/18 348/148 |
| 2016/0031479 A1* | 2/2016 | Fung | B60W 40/09 701/42 |
| 2017/0187963 A1* | 6/2017 | Lee | G06F 3/013 |
| 2017/0247031 A1* | 8/2017 | Feit | B60W 30/0956 |
| 2017/0291613 A1* | 10/2017 | George-Svahn | B60W 50/10 |

FOREIGN PATENT DOCUMENTS

| | | |
|---|---|---|
| JP | 2002-219968 | 8/2002 |
| JP | 2002-279411 | 9/2002 |
| JP | 2007-213164 | 8/2007 |
| JP | 2007-213167 A | 8/2007 |
| JP | 2008-84141 A | 4/2008 |
| JP | 2009-181286 A | 8/2009 |
| JP | 2015-047427 | 3/2015 |

OTHER PUBLICATIONS

IEICE Technical report vol. 107 No. 491 pp. 137-142, IEICE Transactions on information and systems society, Feb. 21, 2008-Feb. 22, 2008.

* cited by examiner

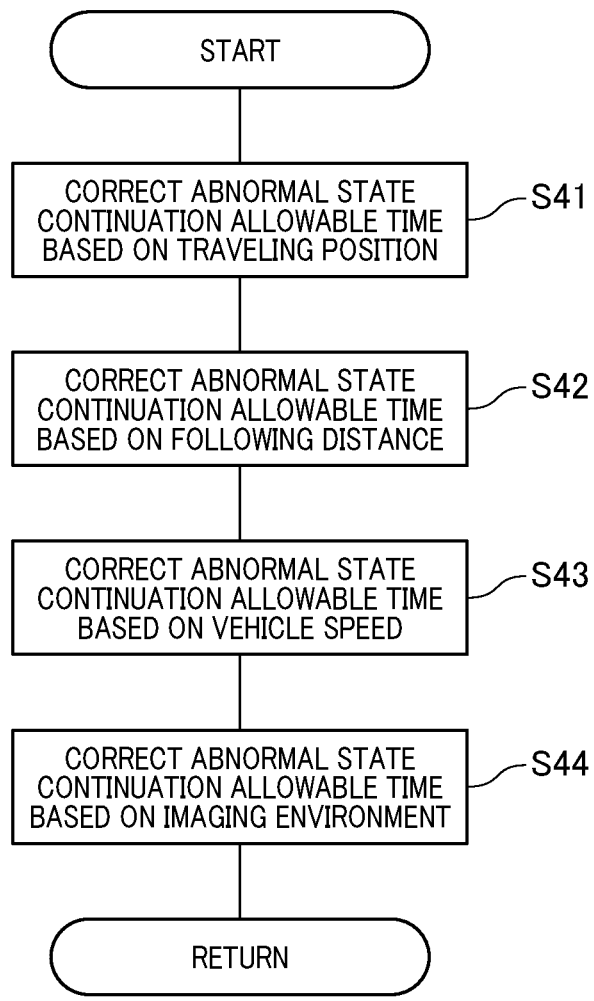

DRIVER ABNORMALITY DETECTION DEVICE AND DRIVER ABNORMALITY DETECTION METHOD

CROSS-REFERENCE TO RELATED APPLICATION

This application is based on and claims the benefit of priority from earlier Japanese Patent Application No. 2015-135439 filed on Jul. 6, 2015, the description of which is incorporated herein by reference.

TECHNICAL FIELD

The present disclosure relates to an abnormality detection technique for detecting an abnormality of a driver of a vehicle.

BACKGROUND ART

Conventionally, a device for determining a driver's inattentive driving (driving without looking ahead) by a method as described below has been proposed (see PTL 1). The conventional device captures an image of the face of the driver by, for example, a camera, and detects the direction of the driver's face or gaze. When the detected direction is within a predetermined range, and moreover, the detection period is within a predetermined period, the conventional device determines that the driver is performing inattentive driving.

CITATION LIST

Patent Literature

[PTL 1] JP 2007-213167 A

SUMMARY OF THE INVENTION

Technical Problem

However, conventional methods which detect an abnormality of a driver based on only one matter such as the direction of a face or a gaze such as the technique disclosed in PTL 1 had a problem that an abnormality may not be accurately detected. In addition, in recent years, it is becoming a social problem that a driver experiences an episode while driving a car and it becomes impossible to continue controlling the vehicle. Thus, there is a need for a technique to accurately detect driver's abnormalities, such as the onset of an illness, in addition to inattentive driving and dozing.

An object of the present disclosure is to provide a driver abnormality detection device that improves the accuracy of driver abnormality detection and a driver abnormality detection method that is executed by a driver abnormality detection device.

Solution to Problem

The driver abnormality detection device (1) of the present disclosure comprises at least two of a direction determination unit (23), a height determination unit (25), and a position determination unit (27); and an abnormal state determination unit (29).

The direction determination unit determines that the state is abnormal when the gaze direction of a driver of a vehicle (2) is not within a first predetermined range based on a captured image of a head (H) of the driver. The height determination unit determines that the state is abnormal when a height of an eye (E) of the driver is not within a second predetermined range based on the captured image. The position determination unit determines that the state is abnormal when a position of the head in a lateral direction is not within a third predetermined range based on the captured image. The abnormal state determination unit determines whether the state of the driver is abnormal based on the determination results of the determination units.

The driver abnormality detection device of the present disclosure configured as above performs determination using at least two (two kinds of) matters and detect the driver's abnormality based on the determination result. Specifically, the driver abnormality detection device carries out abnormal state determination on at least two of the gaze direction of the driver, the height of the driver's eyes, and the position of the driver's head in the lateral direction. The driver abnormality detection device detects the driver's abnormality based on the abnormality state determination results of at least two matters. As described above, the driver abnormality detection device of the present disclosure determines the driver's abnormality based on not only one (one kind of) matter but a plurality of matters (for example, the gaze direction, the height of the eyes, the position of the head in the lateral direction, etc.). As a result, the driver abnormality detection device of the present disclosure can improve the accuracy of the driver abnormality detection (the determination of whether there is an abnormality).

It is to be noted that the reference numbers in parentheses above and in the claims merely indicate an example of the correspondence with the specific means described with respect to the embodiment described below. Thus, the technical scope of the driver abnormality detection device of the present disclosure is not limited.

BRIEF DESCRIPTION OF THE DRAWINGS

FIG. 6 is a flowchart showing the process of setting the continuation allowable time of an abnormal state.

DESCRIPTION OF THE EMBODIMENTS

Embodiments where the driver abnormality detection device according to the present disclosure is applied to a vehicle will be described with reference to the drawings.

1. First Embodiment

[1-1. Configuration]

Figure 1:
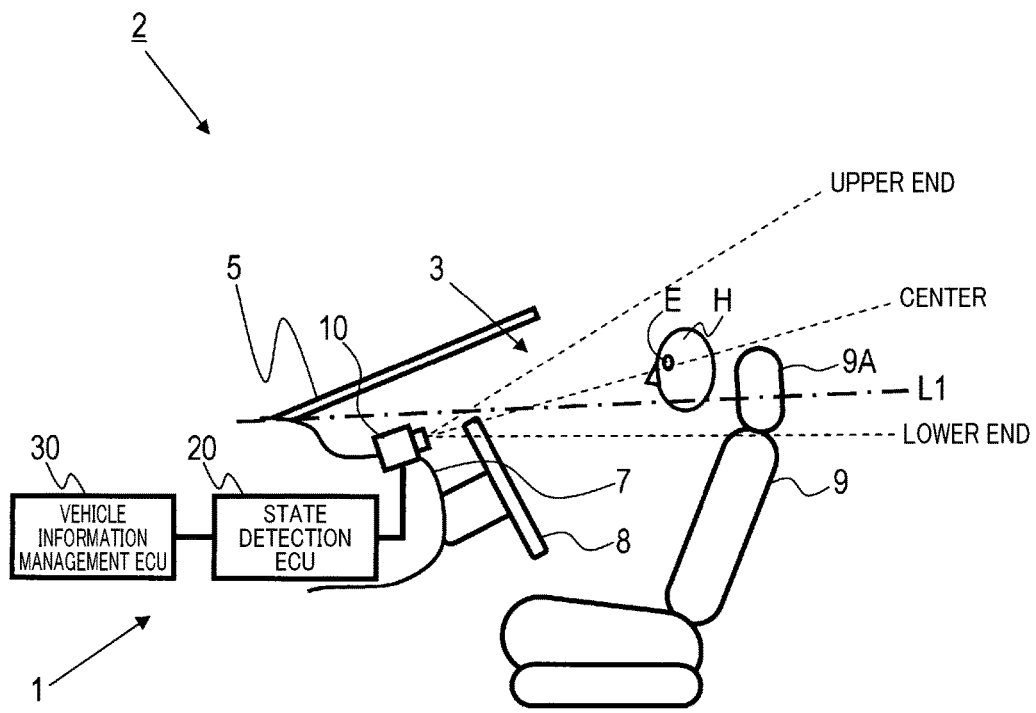
FIG. 1 is a schematic view of a vehicle including a driver abnormality detection device as viewed from the side.

FIG. 1 is a schematic view of a vehicle 2 including a driver abnormality detection device 1 according to the present embodiment as viewed from the side. As shown in FIG. 1, a vehicle 2 comprising the driver abnormality detection device 1 is provided with a windshield 5 in front of a vehicle interior 3. A steering wheel 8 is provided on a dashboard 7 located below the windshield 5. The position of the steering wheel 8 such as its height position, or the like, can be adjusted. A driver's seat 9 is provided behind the steering wheel 8.

The driver abnormality detection device 1 includes a camera lighting unit 10, a state detection ECU 20, and a vehicle information management ECU 30. The camera lighting unit 10 is provided, for example, on the rear side of the upper surface of the dashboard 7. Specifically, the camera lighting unit 10 is provided such that the lower end of the imaging area (imaging capable area) indicated by the dotted lines in FIG. 1 is positioned lower than the lower end of a headrest 9A of the driver's seat 9. Further, the camera lighting unit 10 is provided so that the upper end of the imaging area is located sufficiently above the head H of the driver of the vehicle 2. As described above, the angle of the camera lighting unit 10 in the vertical direction is set so that the upper and lower ends of the imaging capable area are positioned within a predetermined area. As a result, the eyes E of the driver of the vehicle 2 are located at the center of the imaging area of the camera lighting unit 10 in the vertical direction.

Figure 2:
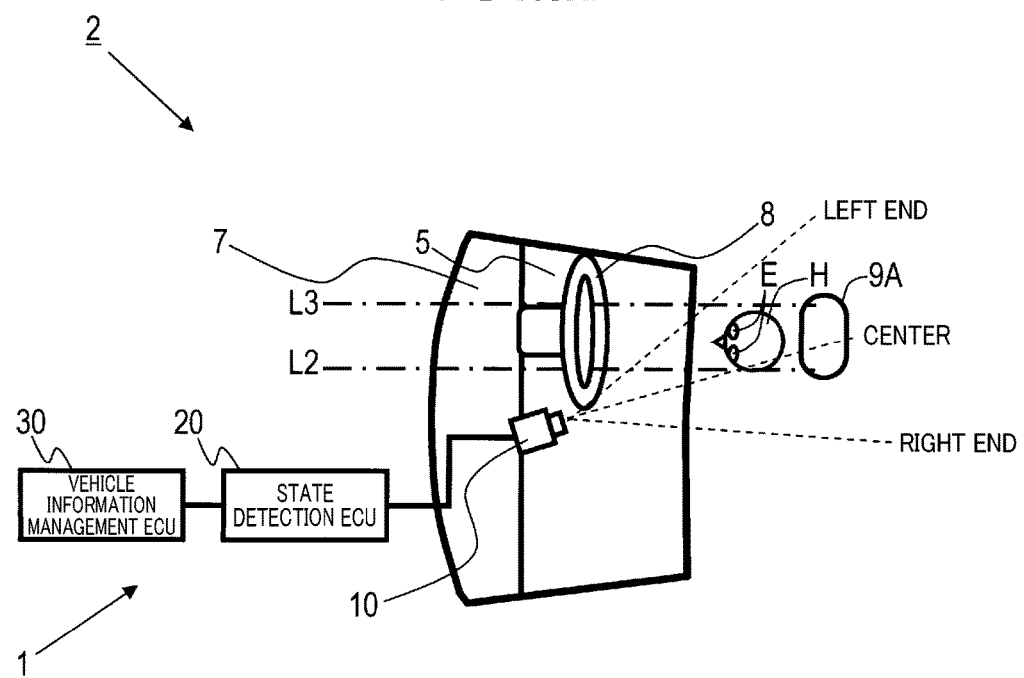
FIG. 2 is a schematic view of a vehicle including a driver abnormality detection device as viewed from the top.

FIG. 2 is a schematic view of a vehicle 2 including a driver abnormality detection device 1 according to the present embodiment as viewed from the top. As shown in FIG. 2, the camera lighting unit 10 is provided such that the right end of the imaging area (the right end seen from the viewpoint of the camera) indicated by the dotted lines in FIG. 2 is positioned further right than the right end of the headrest 9A. Further, the camera lighting unit 10 is provided so that the left end of the imaging area (the left end seen from the viewpoint of the camera) is located left to the head H of the driver of the vehicle 2. As described above, the angle of the camera lighting unit 10 in the lateral direction is set so that the left and right ends of the imaging capable area are positioned within a predetermined area. As a result, the head H of the driver of the vehicle 2 is located in the vicinity of the center of the imaging area of the camera lighting unit 10 in the lateral direction. In the present embodiment, the camera lighting unit 10 functions as an imaging unit for capturing an image of the head H of the driver.

The state detection ECU 20 is a processing unit that detects the state of the driver (presence/absence of abnormality) based on the imaging result (captured image) of the camera lighting unit 10. The vehicle information management ECU 30 is a processing unit that acquires information on the vehicle 2 (hereinafter referred to as "vehicle information") including the vehicle speed and surrounding situation and the like. The vehicle information management ECU 30 is connected with, for example, a navigation device, various sensors (a millimeter wave radar, a camera outside the vehicle, a vehicle speed sensor), an inter-vehicle communication system, and the like, and the vehicle information is acquired from these devices. In addition, the vehicle information management ECU 30 stores the acquired vehicle information in a predetermined storage area, and manages the information so that it can be used by other processing units. In the present embodiment, the vehicle information management ECU 30 functions as an information acquisition unit that acquires information on the traveling situation, the surrounding situation, and the like of the vehicle 2. The state detection ECU 20 and the vehicle information management ECU 30 are microcomputers including a CPU, a memory (for example, ROM and RAM), 1/O, and the like. The state detection ECU 20 and the vehicle information management ECU 30 carry out various processes related to driver abnormality detection by making the CPU execute, for example, a program installed in the ROM.

Figure 3:
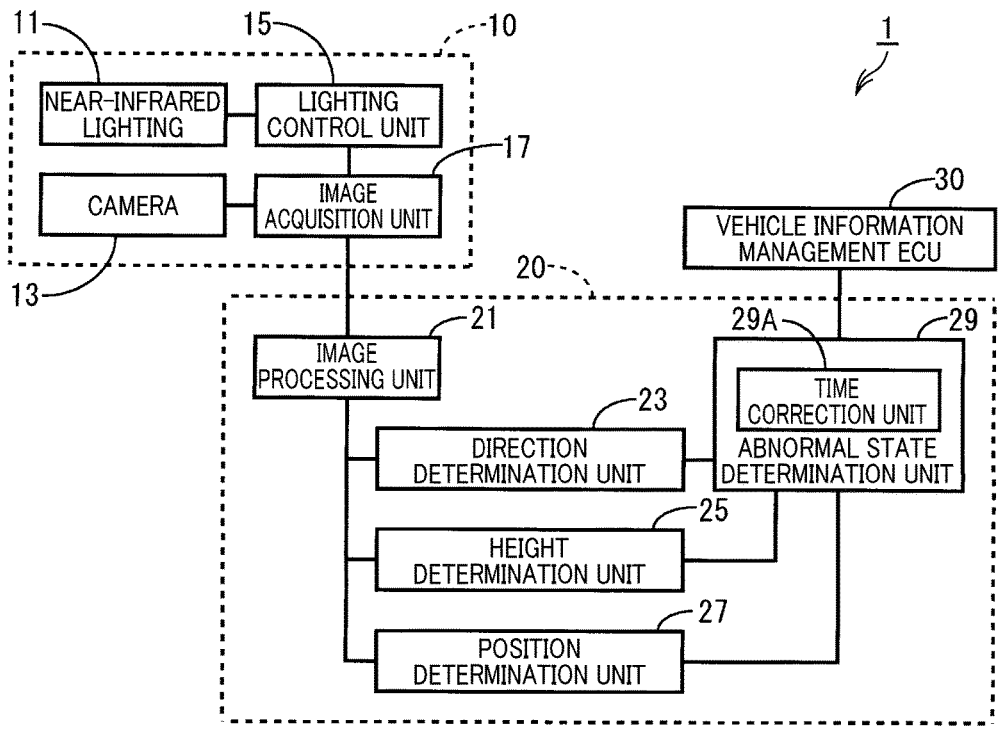
FIG. 3 is a functional block diagram of the driver abnormality detection device.

FIG. 3 is a functional block diagram of the driver abnormality detection device 1 according to the present embodiment. As shown in FIG. 3, the camera lighting unit 10 includes a near-infrared lighting 11, a camera 13, a lighting control unit 15, and an image acquisition unit 17. The near-infrared lighting 11 irradiates the imaging area of the camera 13 with near-infrared rays. The lighting control unit 15 controls the irradiation timing of the near infrared rays irradiated by the near-infrared lighting 11. The lighting control unit 15 is a microcomputer including a CPU, a memory (for example, ROM and RAM), and the like. Alternatively, it may be formed by an electronic circuit having equivalent functions. For example, the lighting control unit 15 controls the near-infrared lighting 11 for a control period (near-infrared ray irradiation period) of 1 ms in every control cycle of 30 ms (near-infrared ray irradiation cycle). At this time, the lighting control unit 15 outputs a control command to the near-infrared lighting 11 in order for near-infrared rays to irradiate a predetermined area. In the present embodiment, the control cycle is preferably 28 to 32 ms. The control period is preferably 0.8 to 1.2 ms. The camera 13 is, for example, a CMOS (Complementary Metal Oxide Semiconductor) camera or the like. During the control period, the camera 13 captures images of the imaging area irradiated with near-infrared rays from the near-infrared lighting 11 and outputs the imaging data to the image acquisition unit 17. The image acquisition unit 17 generates digital image data (hereinafter referred to as "captured image data") based on the imaging data input from the camera 13, and inputs the generated data to the state detection ECU 20.

The state detection ECU 20 is a microcomputer including a CPU, a memory (for example, ROM and RAM), and the like. The state detection ECU 20 has various processing units as shown in FIG. 3. Specifically, the state detection ECU 20 includes an image processing unit 21, a direction determination unit 23, a height determination unit 25, a position determination unit 27, and an abnormal state determination unit 29. Each processing unit may be configured as a processing unit having an independent CPU, electronic circuit, etc. Alternatively, each processing unit may be configured as independent program modules or a single program module executed by a single CPU.

The image processing unit 21 performs various kinds of image processing on the captured image data input from the image acquisition unit 17. Examples of the image processing include a process for facilitating recognition of the outline of the driver's head H or eye E, or the center of the pupil of the eye E and a Purkinje image.

The direction determination unit 23 detects the gaze direction of the driver's eyes E and determines whether the detected gaze direction is within a first predetermined range. The direction determination unit 23 determines that the state is abnormal when the driver's gaze is not within the first predetermined range. Examples of a method of detecting the gaze direction include the corneal reflection method, and the face feature point model based method. Thus, the direction determination unit 23 may use a well-known detection method. Alternatively, a combination of well-known detection methods may be applied. The corneal reflection method is explained in detail in, for example, JP 2015-47427 A and journal "Cognitive Science," JCSS (Japanese Cognitive Science Society), 2002, Vol. 9, No. 4, pp. 565-576, etc. Therefore, it will not be described in detail herein. Further, the face feature point model based method is described in detail in, for example, JP 2007-265367 A and "IEICE technical report," IEICE (The Institute of Electronics, Information and Communication Engineers), Vol. 107, No. 491, pp. 137-142, etc. Therefore, it will not be described in detail herein.

Figure 4:
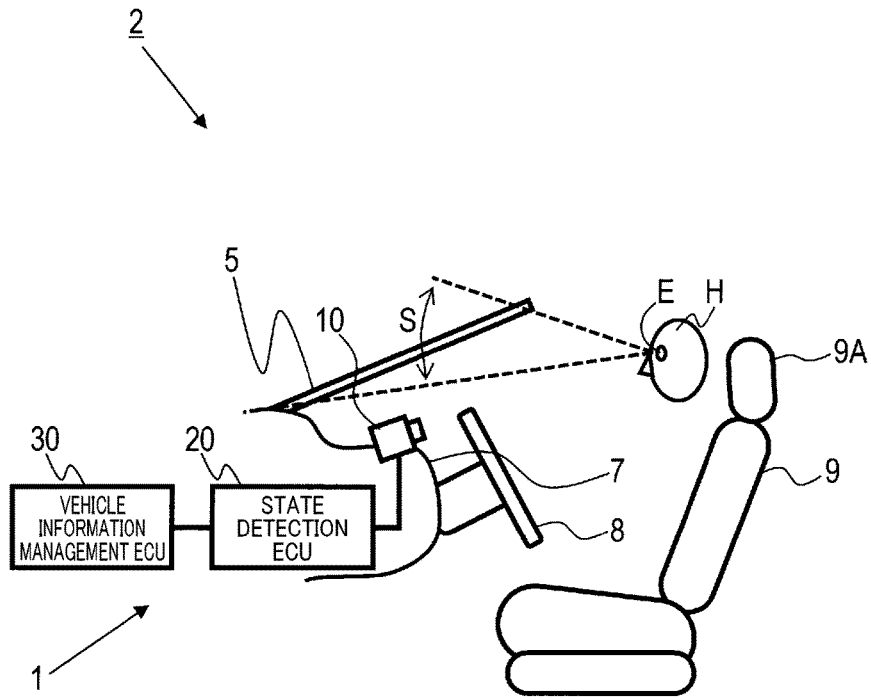
FIG. 4 is a schematic diagram showing the effective field of view of the driver.

The first predetermined range can be set in various ways. FIG. 4 is a schematic diagram showing the effective field of view S of the driver. In the present embodiment, as shown in FIG. 4, the first predetermined range is defined so that at least a part of the effective field of view S corresponding to the gaze direction of the driver's eyes E overlaps with the area of the windshield 5. Further, the effective field of view S has a spread of 15° in the lateral direction, 8° in the upward direction, and 12° in the downward direction with respect to the gaze direction. The direction determination unit 23 determines whether the detected gaze direction is inside the first predetermined range thus set. For example, the direction determination unit 23 determines that the gaze direction is outside the first predetermined range when the gaze direction of the driver's eyes E cannot be detected such as when the eyes E are closed.

The height determination unit 25 detects the height of the driver's eyes E and determines whether the detected height is within a second predetermined range. The height determination unit 25 determines that the state is abnormal when the height of the driver's eyes E is not within the second predetermined range. The second predetermined range can be set in various ways. In the present embodiment, the second predetermined range is defined such that the tail lamps of the vehicle in front can be viewed by the driver's eyes E via the windshield 5. The height determination unit 25 determines whether the detected height is within the second predetermined range thus set. To be specific, the determination is carried out as follows. First, it is assumed that the tail lamps of the vehicle in front are located at a distance of 11.1 m from the front end of the vehicle 2 and at a height of 0.35 m from the road surface. When the height of the driver's eyes E from the position thus assumed is located above a height reference line L1 (see FIG. 1) passing through the lower end of the windshield 5, the height determination unit 25 determines that the height of the driver's eyes E is within the second predetermined range. The imaging range of the camera lighting unit 10 in the vertical direction is defined as indicated by the dotted lines in FIG. 1 (the range of the upper end and the lower end in the drawing). Thus, the height determination unit 25 can appropriately determine whether the height of the driver's eyes E is within the second predetermined range. When the eyes E of the driver cannot be detected, for example, when the eyes E are narrow or the eyes E are small, etc., the height determination unit 25 determines the height assuming that the eyes E are near the center of the driver's head H in the vertical direction.

The position determination unit 27 detects the position of the driver's head H in the lateral direction and determines whether the detected position is within a third predetermined range. The position determination unit 27 determines that the state is abnormal when the position of the head H in the lateral direction is not within the third predetermined range. The third predetermined range can be set in various ways. In the present embodiment, the third predetermined range is defined such that the center of gravity of the driver's head H is located in front of the headrest 9A of the driver's seat 9 in the vehicle 2. The position determination unit 27 determines whether the detected position in the lateral direction is within the third predetermined range thus set. To be specific, the determination is carried out as follows. When the center of gravity of the driver's head H in the lateral direction is located between two position reference lines L2 and L3 (see FIG. 2) which pass through the left and right ends of the headrest 9A, the position determination unit 27 determines that the detected position in the lateral direction is within the third predetermined range. The size of the headrest 9A is defined by the regulations to be ±85 mm or greater with respect to the center in the lateral direction. Therefore, the interval between the two position reference lines L2 and L3 is 170 mm or greater. In addition, the center of gravity of the driver's head H in the vertical direction can be regarded as being located at the height of both the right and left eyes E. The imaging range of the camera lighting unit 10 in the lateral direction is defined as a range indicated by the dotted lines in FIG. 2 (the range of the left end and the right end in the drawing). Thus, the position determination unit 27 can appropriately determine whether the center of gravity in the lateral direction of the driver's head H is within the third predetermined range. The center of gravity of the driver's head H in the lateral direction may be the center position of the left and right eyes E (both eyes).

The abnormal state determination unit 29 determines whether the state of the driver is abnormal based on the determination results of the direction determination unit 23, the height determination unit 25, and the position determination unit 27. The abnormal state determination unit 29 carries out driver's abnormality detection based on the determination results of at least two determination units of the plurality of determination units 23, 25, and 27 (abnormal state determination results based on two matters). When at least one of the plurality of determination units 23, 25, and 27 determines that the state is abnormal (when an abnormal state is detected in at least one of a plurality of matters), the abnormal state determination unit 29 determines that the driver's state is abnormal. Further, the abnormal state determination unit 29 includes a time correction unit 29A that corrects the time (hereinafter referred to as "continuation allowable time") for which the abnormality state determined by the determination units 23, 25, and 27 is allowed to continue. For each of the determination results of the direction determination unit 23, the height determination unit 25, and the position determination unit 27, a continuation allowable time is set for a state (abnormal state) where the matter is outside the predetermined range. The time correction unit 29A corrects the continuation allowable time in accordance with the vehicle information input from the vehicle information management ECU 30.

[1-2. Processing]

Next, the abnormality determination process carried out by the state detection ECU 20 will be described with reference to the flowcharts shown in FIGS. 5 and 6. This process is executed based on a program stored in the ROM provided in the state detection ECU 20. Further, this process is executed by the CPU of the state detection ECU 20 at a predetermined cycle (for example, every 30 ms which is the control cycle of the near-infrared lighting 11).

Figure 5:
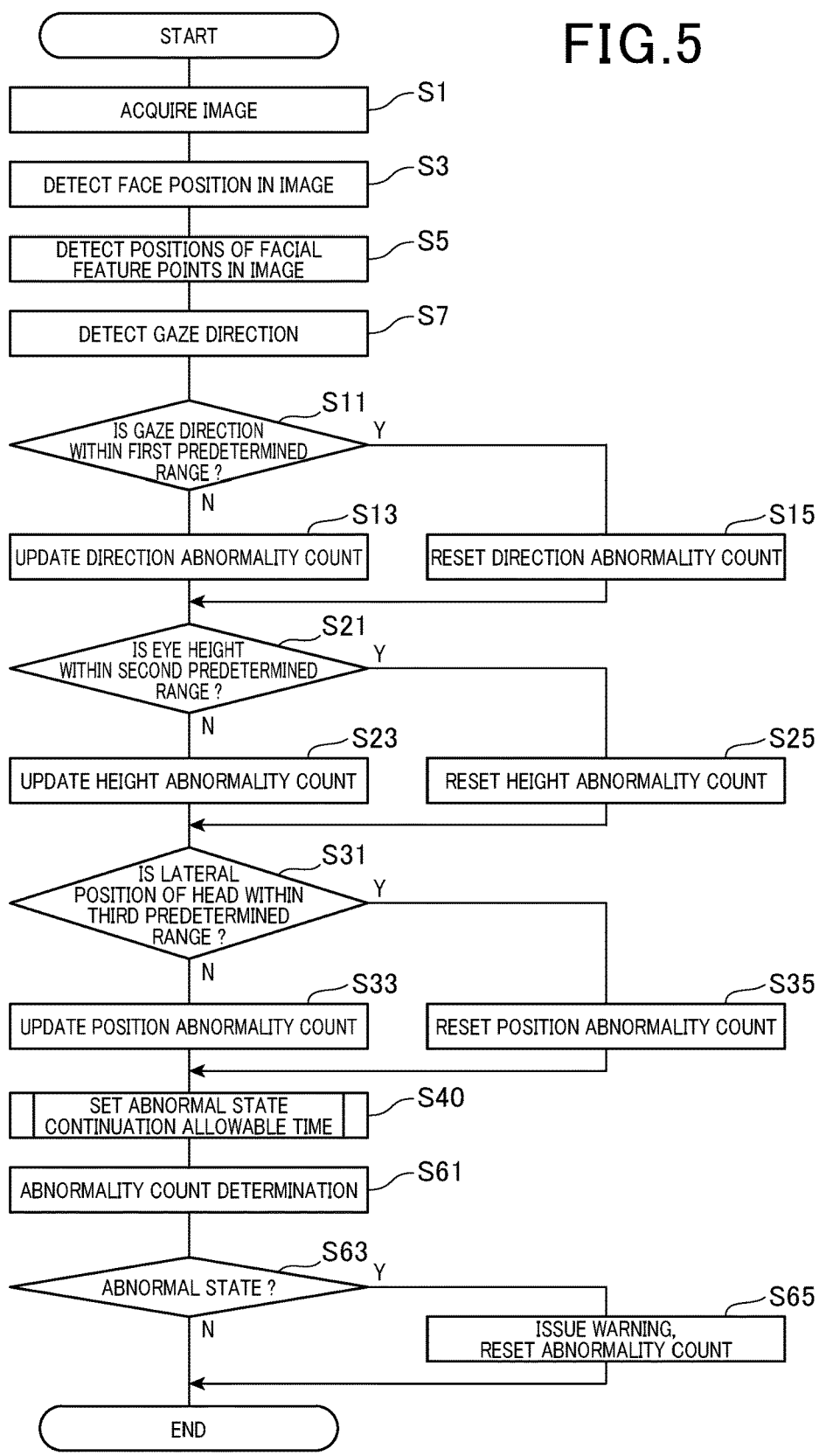
FIG. 5 is a flowchart showing the abnormality determination process.

FIG. 5 is a flowchart showing the abnormality determination process. As shown in FIG. 5, in the state detection ECU 20, the image processing unit 21 acquires captured image data of the camera lighting unit 10 (S1). At this time, the image processing unit 21 performs predetermined image processing on the acquired captured image data. Then, the state detection ECU 20 recognizes the outline of the driver's head H from the captured image data (data after image processing) of the camera lighting unit 10, and detects the position of the face in the image (S3). Further, the state detection ECU 20 recognizes the outline of the driver's eye E, the pupil, etc. from the captured image data (data after image processing) of the camera lighting unit 10, and detects the positions of feature points of the face in the image (S5). Next, in the state detection ECU 20, the direction determination unit 23 detects the gaze direction of the driver based on the positions of the feature points of the face detected in step S5 (S7). The direction determination unit 23 determines whether the detected gaze direction is within the first predetermined range (whether it is an appropriate direction that falls within the first predetermined range) (S11).

When the direction determination unit 23 determines that the gaze direction is not within the first predetermined range (inappropriate direction) (N at S11), the state detection ECU 20 proceeds to the process of step S13. Then, the state detection ECU 20 updates the direction abnormality count (S13). On the other hand, when the direction determination unit 23 determines that the gaze direction is within the first predetermined range (appropriate direction) (Y at S11), the state detection ECU 20 proceeds to the process of step S15. Then, the state detection ECU 20 resets the direction abnormality count (S15). Note that the direction abnormality count is reset (initialized) to zero when the vehicle 2 is started, and is incremented (counted up) when the process of step S13 is executed. On the other hand, when the process of step S15 is executed, the direction abnormality count is reset to zero again. That is, the direction abnormality count corresponds to a value which records the duration of abnormality determination of the driver's gaze direction. Thus, the state detection ECU 20 can obtain the duration of the abnormal state when the gaze direction is inappropriate by referring to the direction abnormality count.

Next, in the state detection ECU 20, the height determination unit 25 determines whether the height of the driver's eyes E is within the second predetermined range (whether it is an appropriate height that falls within the second predetermined range) (S21). When the height determination unit 25 determines that the height of the eyes E is not within the second predetermined range (inappropriate height) (N at S21), the state detection ECU 20 proceeds to the process of step S23. Then, the state detection ECU 20 updates the height abnormality count (S23). On the other hand, when the height determination unit 25 determines that the height of the eyes E is within the second predetermined range (appropriate height) (Y at S21), the state detection ECU 20 proceeds to the process of step S25. Then, the state detection ECU 20 resets the height abnormality count (S25). Note that, the height abnormality count is reset (initialized) to zero when the vehicle 2 is started, and is incremented (counted up) when the process of step S23 is executed. On the other hand, when the process of step S25 is executed, the height abnormality count is reset to zero again. That is, the height abnormality count corresponds to a value which records the duration of abnormality determination in the driver's eye E height determination. Thus, the state detection ECU 20 can obtain the duration of the abnormal state when the height of the eyes E is inappropriate by referring to the height abnormality count.

Next, in the state detection ECU 20, the position determination unit 27 determines whether the position of the driver's head H in the lateral direction is within the third predetermined range (whether it is an appropriate position that falls within the third predetermined range) (S31). When the position determination unit 27 determines that the position of the head H in the lateral direction is not within the third predetermined range (inappropriate position) (N at S31), the state detection ECU 20 proceeds to the process of step S33. Then, the state detection ECU 20 updates the position abnormality count (S33). On the other hand, when the position determination unit 27 determines that the position of the head H in the lateral direction is within the third predetermined range (appropriate position) (Y at S31), the state detection ECU 20 proceeds to the process of step S35. Then, the state detection ECU 20 resets the position abnormality count (S35). Note that, the position abnormality count is reset (initialized) to 0 when the vehicle 2 is started, and is incremented (counted up) when the process of step S33 is executed. On the other hand, when the process of step S35 is executed, the position abnormality count is reset to 0 again. Thus, the state detection ECU 20 can obtain the duration of the abnormal state when the position of the head H in the lateral direction is inappropriate by referring to the position abnormality count.

Next, in the state detection ECU 20, the time correction unit 29A in the abnormal state determination unit 29 sets the continuation allowable time of the abnormality state determined by each determination unit 23, 25, and 27 (S40). A default value of the continuation allowable time is preset for each abnormal state determined by each determination unit 23, 25, and 27. In the process of step S40, the time correction unit 29A increases or decreases the continuation allowable time according to the vehicle information such as the traveling situation of the vehicle 2 or the surrounding situation of the vehicle 2.

The specific process of step S40 will be described with reference to FIG. 6. FIG. 6 is a flowchart showing the process of setting the continuation allowable time of an abnormal state (correction process). As shown in FIG. 6, the time correction unit 29A included in the abnormal state determination unit 29 corrects and sets the continuation allowable time of the abnormal state in the gaze direction according to the traveling position of the vehicle 2 (S41). At this time, the time correction unit 29A determines whether the traveling position of the vehicle 2 is in front of a position such as an intersection or a T-junction at which right or left turn may be performed, and based on the determination result, the time correction unit 29A corrects the continuation allowable time of the abnormal state in the gaze direction. Information on the presence or absence of an intersections, a T-junction, etc. in the path of the vehicle 2 is obtained based on, for example, information from a navigation device or the like, connected to the vehicle information management ECU 30. For example, when the vehicle 2 is in front of an intersection, a T-junction, or the like, the driver checks for safety in the lateral direction before turning right or left. Thus, the period of time for which the driver's gaze direction leaves the range of the windshield 5 (the first predetermined range) becomes longer. Accordingly, the time correction unit 29A increases (prolongs) the continuation allowable time of the abnormal state in the gaze direction. For example, the correction amount (increase amount) of the continuation allowable time is read out from reference table data pre-stored in the ROM of the state detection ECU 20. In the process of step S41, the time correction unit 29A may determine the traveling situation of the vehicle 2 based on, in addition to the presence of an intersection or a T-junction, the presence of merging and/or a crosswalk, etc., and correct the continuation allowable time of the abnormal state in the gaze direction in accordance with the determination result.

Next, the time correction unit 29A corrects and sets the continuation allowable time for each of the abnormal states in the gaze direction, the height of the eyes E, and the position of the head H in the lateral direction based on the following distance (S42). The information on the following distance from the vehicle in front is acquired based on, for example, information from a millimeter wave radar, a camera outside the vehicle, an inter-vehicle communication system, or the like connected to the vehicle information management ECU 30. For example, when the following distance from the vehicle in front is short, the driver is required to be more attentive. Thus, the time correction unit 29A decreases (shortens) the continuation allowable time of each abnormal state described above. Further, the correction amount (decrease amount) of the continuation allowable time is read out in the same way as in the process of step S41.

Next, the time correction unit 29A corrects and sets the continuation allowable time for each of the abnormal states in the gaze direction and the position of the head H in the lateral direction based on the vehicle speed (S43). Information on the vehicle speed is obtained based on, for example, information from a speed sensor connected to the vehicle information management ECU 30. For example, when the vehicle speed becomes higher, the driver is required to pay more attention to the distant area. Thus, the time correction unit 29A decreases (shortens) the continuation allowable time of each of the abnormal states in the gaze direction and the position of the head H in the lateral direction. Further, the correction amount (decrease amount) of the continuation allowable time is read out in the same way as in the process of step S42.

Next, the time correction unit 29A corrects and sets the continuation allowable time of the abnormal state in the gaze direction based on the imaging environment of the camera 13 (S44). The time correction unit 29A determines whether the imaging environment of the camera 13 is affected by backlight or direct sunlight, and corrects the continuation allowable time of the abnormal state in the gaze direction based on the determination result. Information on the intensity of backlight or direct sunlight is obtained based on, for example, information from a camera outside the vehicle connected to the vehicle information management ECU 30. For example, when the backlight, direct sunlight, or the like is intense, the gradation of the bright part may be lost, and the image captured by the camera 13 may partially turn white (halation). When such phenomenon occurs, the gaze direction cannot be detected. Thus, the gaze direction is determined to be in an abnormal state. Accordingly, the time correction unit 29A increases (prolongs) the continuation allowable time of the abnormal state in the gaze direction. The correction amount (increase amount) of the continuation allowable time is read out in the same way as in the process of step S41.

Returning to the explanation of FIG. 5, in the state detection ECU 20, the time correction unit 29A in the abnormal state determination unit 29 sets the continuation allowable time for each abnormality state as described above. Next, in the state detection ECU 20, the abnormal state determination unit 29 carries out determination on each of the abnormality counts updated by the processes in steps S13, S23, and S33 (S61). Based on each abnormality count, the time for which the corresponding abnormal state continued can be known (hereinafter referred to as "abnormal state duration"). Thus, in the process of step S61, the abnormal state determination unit 29 refers to the updated values of the respective abnormality counts and the corrected values of the respective continuation allowable times, and compares the duration of each abnormal state with the continuation allowable time of each abnormal state. Then, the abnormal state determination unit 29 determines whether the duration of an abnormal state exceeds the continuation allowable time of that abnormal state (the value of the abnormality count>the value of the continuation allowable time). When the duration of an abnormal state exceeds the continuation allowable time of that abnormal state, the abnormal state determination unit 29 determines that the state of the driver is abnormal (detects an abnormal state of the driver). That is, when at least one of the plurality of matters is determined to be abnormal continuously for an allowable time or longer, the abnormal state determination unit 29 determines that the driver's state is abnormal. As described above, in the present embodiment, the abnormal state determination unit 29 carries out abnormal state determination toward at least two matters.

The abnormal state determination unit 29 determines whether the state of the driver is abnormal based on the determination result of the process in step S61 (S63). When an abnormal state is detected in at least one of the plurality of matters, the abnormal state determination unit 29 determines that the driver's state is abnormal in the process of step S61. When the abnormal state determination unit 29 determines that the driver is not in an abnormal state (N at S63), the state detection ECU 20 suspends the process. On the other hand, when the abnormal state determination unit 29 determines that the driver is in an abnormal state (Y at S63), the state detection ECU 20 proceeds to the process of step S65. Then, the state detection ECU 20 activates a safety device such as a buzzer to issue a warning and notify the driver of danger (S65). In addition, at this time, the state detection ECU 20 resets all of the abnormality counts, and suspends the process. The suspended process is executed again from the process of step S1 after a predetermined time has elapsed.

[1-3. Effects]

As described above in detail, the driver abnormality detection device 1 according to this embodiment provides advantageous effects as follows.

[1A] The driver abnormality detection device 1 according to the present embodiment determines the driver's abnormality based on not only one but at least two matters from any one of the gaze direction, the height of the eyes E, and the position of the head H in the lateral direction. As a result, the driver abnormality detection device 1 according to the present embodiment can improve the accuracy of the driver abnormality detection (the determination of whether there is an abnormality).

[1B] The driver abnormality detection device 1 according to the present embodiment has a clear criterion for abnormality state determination (first, second, and third predetermined ranges, etc.) for each of the matters, i.e., the gaze direction, the height of the eyes E, and the position of the head H in the lateral direction. Specifically, the criteria for the matters are clearly defined by numerical values. As a result, the driver abnormality detection device 1 according to the present embodiment can accurately detect the driver's abnormality. In addition, an abnormality of the driver which could not be detected conventionally may also be detected.

[1C] The driver abnormality detection device 1 according to the present embodiment has criteria for the height of the eyes E and the position of the head H in the lateral direction which do not depend on the physical characteristics of the driver. In other words, a uniformly applicable criteria is applied to any driver. As a result, the driver abnormality detection device 1 according to the present embodiment has a universal program for executing the process, and therefore the development cost can be reduced.

[1D] The driver abnormality detection device 1 according to the present embodiment does not require the camera lighting unit 10 to be provided in front of the driver for detecting the driver state. Thus, the camera lighting unit 10 may be placed, for example, not at a predetermined position on the right or left corresponding to the front of the driver, but at the center in the vehicle width direction, as shown in FIG. 2. Since the camera lighting unit 10 can be freely set in the driver abnormality detection device 1 according to the present embodiment, the degree of freedom in the layout of the vehicle interior 3 is high.

[1E] In the driver abnormality detection device 1 according to the present embodiment, the continuation allowable time of the abnormality state of each matter is individually set (corrected) in accordance with the traveling situation and/or the surrounding situation of the vehicle 2. As a result, the driver abnormality detection device 1 according to the present embodiment can more accurately detect the driver's abnormality based on the traveling situation and/or the surrounding situation of the vehicle 2.

2. Other Embodiments

An embodiment where the driver abnormality detection device 1 according to the present disclosure is applied to a vehicle 2 has been described above. However, the driver abnormality detection device 1 of the present disclosure is not limited to the contents of the above-described embodiment. The driver abnormality detection device 1 of the present disclosure may be implemented, for example, in the following manners.

[2A] In the above embodiment, the effective field of view S has a spread of 15° in each of the left and right directions with respect to the gaze of the driver, but this is not limiting. The spread in the lateral direction with respect to the gaze direction may be changed, for example, in accordance with the country or region (facial characteristics of people which vary depending on the country or region) in which the driver abnormality detection device 1 is used. Specifically, the spread in the lateral direction may be changed as appropriate within the range of 14 to 16°. The same also applies to the spread in the vertical direction with respect to the gaze direction. In the above embodiment, the effective field of view S has a spread of 8° in the upward direction and 12° in the downward direction, but this is not limiting. The spread in the vertical direction with respect to the gaze direction may be changed as appropriate, for example, within the range of 7 to 9° in the upward direction and within the range of 11 to 13° in the downward direction.

[2B] In the above embodiment, the height reference line L1 for determining the height of the driver's eyes E is set based on the positions of the tail lamps of the vehicle in front. It was assumed that the tail lamps of the vehicle in front are located at a distance of 11.1 m from the front end of the vehicle 2 and at a height of 0.35 m from the road surface, but this is not limiting. The positions of the tail lamps of the vehicle in front may be changed, for example, in accordance with the country or region (the average vehicle speed or vehicle form which varies depending on the country or region) in which the driver abnormality detection device 1 is used. Specifically, the positions of the tail lamps may be changed as appropriate as long as the distance from the front end of the vehicle 2 is within the range of 10 to 12 m, and the height from the road surface is within the range of 0.3 to 0.4 m.

[2C] The above embodiment is configured to set first, second, and third predetermined ranges as the criteria for abnormality state determination of the gaze direction, the height of the eyes E, and the position of the head H in the lateral direction, but this is not limiting. For example, the first, second, and third predetermined ranges may be set based on different criteria regardless of the positions of the windshield 5, the tail lamps of the vehicle in front, the headrest 9A, etc.

[2D] In the above embodiment, the driver abnormality detection device 1 includes all of the direction determination unit 23, the height determination unit 25, and the position determination unit 27, but the present invention is not limited to this. The driver abnormality detection device 1 of the present disclosure may be configured to have at least two of a plurality of determination units. That is, the driver abnormality detection device 1 of the present disclosure suffices if it is configured to determine an abnormal state based on at least two matters and detect the driver's abnormality based on the determination result.

[2E] In the above embodiment, the duration of the abnormal state is compared with the continuation allowable time of the abnormal state, and when the duration of the abnormal state exceeds the continuation allowable time of the abnormal state, the abnormality of the driver is detected. However, the present invention is not limited to this. For example, the driver abnormality detection device 1 according to the present disclosure may be configured to detect the driver's abnormality when the state is determined to be abnormal in at least one of the plurality of matters, the gaze direction, the height of the eyes E, and the position of the head H in the lateral direction, regardless of the continuation allowable time. However, in that case, it is better to set the criteria (first, second, and third predetermined ranges) for abnormal state determination of the matters in a range different from the above embodiment.

[2F] In the above embodiment, the continuation allowable time of the abnormality state of each matter is individually set (corrected) in accordance with the traveling situation and/or the surrounding situation of the vehicle 2, but this is not limiting. For example, a constant value (fixed value) may be set as the continuation allowable time of the abnormal state of each matter. Further, each continuation allowable time may be set according to at least one parameter such as the vehicle speed. For example, when the vehicle speed is used as a parameter, each continuation allowable time may be set as follows. When the vehicle speed is 20 km/h or greater, each continuation allowable time may be set to 2 seconds. On the other hand, when the vehicle speed is less than 20 km/h, the value (seconds) obtained by dividing 40 seconds by the value of the vehicle speed (unit: km/h) may be set as each continuation allowable time.

[2G] In the first embodiment, a configuration in which the driver abnormality detection device 1 is provided in the vehicle 2 has been described. The driver abnormality detection device 1 of the present disclosure may be installed in the vehicle 2 from the beginning or may be installed in the vehicle 2 later. When the determination criteria (first, second and third predetermined ranges) for abnormal state determination of the matters are set as in the above embodiment, the positional relationship between the windshield 5 and the camera lighting unit 10 can be known. Thus, even when the camera lighting unit 10 is installed in the vehicle 2 later, the abnormality determination process described in the above embodiment can be executed. The positional relationship between the windshield 5 and the camera lighting unit 10 can also be detected by analyzing the captured image of the camera lighting unit 10. However, if the driver abnormality detection device 1 is installed in the vehicle 2 later, it may be difficult to link the detection results of the driver's abnormal state with the driving control (automatic braking, etc.).

[2H] In the above embodiment, for example, like the state detection ECU 20 of the driver abnormality detection device 1, a single component has a plurality of functions (processing units), but the present invention is not limited to this. For example, when one component has a plurality of functions, each function may be distributed to a plurality of components. On the other hand, when a plurality of components have different functions, the functions of each components may be integrated into a single component. Further, in the above embodiment, a part of the configuration of the driver abnormality detection device 1 may be replaced with a known configuration having a similar function. In the above embodiment, a part of the configuration of the driver abnormality detection device 1 may be omitted. In the above embodiment, a part of the configuration of the driver abnormality detection device 1 may be added to the configuration of another embodiment or replaced with a part thereof. The driver abnormality detection device 1 of the present disclosure can be realized by any embodiment included in the technical idea (technical scope) for achieving the object of the present disclosure.

[2I] The functions provided by the driver abnormality detection device 1 of the present disclosure can also be provided in the following forms. Specifically, it may be a system including the driver abnormality detection device 1 as a component, a program for causing a computer to function as the driver abnormality detection device 1, or a medium in which the program is recorded.

REFERENCE SIGNS LIST

1 . . . Driver abnormality detection device
2 . . . Vehicle
5 . . . Windshield
7 . . . Dashboard
8 . . . Steering wheel
9 . . . Driver's seat
9A . . . Headrest
10 . . . Camera lighting unit
11 . . . Near-infrared lighting
13 . . . Camera
15 . . . Lighting control unit
17 . . . Image acquisition unit
20 . . . State detection ECU
21 . . . Image processing unit
23 . . . Direction determination unit
25 . . . Height determination unit
27 . . . Position determination unit
29 . . . Abnormal state determination unit
29A . . . Time correction unit
30 . . . Vehicle information management ECU
E . . . Eyes
H . . . Head
S . . . Effective field of view

The invention claimed is:

1. A driver abnormality detection device comprising:
at least two of determination units including a direction determination unit which determines that a state is abnormal when a gaze direction of a driver of a vehicle is not within a first predetermined range based on a captured image of a head of the driver, a height determination unit which determines that the state is abnormal when a height of an eye of the driver is not within a second predetermined range based on the captured image, and a position determination unit which determines that the state is abnormal when a position of the head in a lateral direction is not within a third predetermined range based on the captured image;
an abnormal state determination unit which determines that the state of the driver is abnormal when at least one of the determination units determines that the state has been abnormal continuously for a time equal to or longer than a continuation allowable time set for that determination unit;
an information acquiring unit which acquires a surrounding situation of the vehicle; and
a time correction unit which corrects the continuation allowable time set for at least one of the determination units according to the surrounding situation acquired by the information acquiring unit,
wherein
one of the determination units is the position determination unit, and the third predetermined range is set within a range in which a center of gravity of the head is located in front of a headrest of a driver's seat in the vehicle, and
the center of gravity of the head in the lateral direction is located between two position reference lines, which pass through the left and right ends of the headrest.

2. The driver abnormality detection device according to claim 1, wherein one of the determination units is the direction determination unit, and the first predetermined range is set so that at least a part of an effective field of view corresponding to the gaze direction overlaps with a range of a windshield of the vehicle.

3. The driver abnormality detection device according to claim 2, wherein the effective field of view has a predetermined spread in vertical and lateral directions with respect to the gaze direction, and the first predetermined range is set based on the effective field of view having the predetermined spread.

4. The driver abnormality detection device according to claim 1, wherein one of the determination units is the height determination unit, and the second predetermined range is set within a range in which a tail lamp of a vehicle in front can be viewed with the eyes via a windshield of the vehicle.

5. The driver abnormality detection device according to claim 1, wherein the surrounding situation includes whether a traveling position of the vehicle is in front of an intersection, a T-junction, merging, or a crosswalk.

6. A driver abnormality detection method executed by a driver abnormality detection device installed in a vehicle, the driver abnormality detection method comprising:
at least two of determination steps including a direction determination step of determining that the state is abnormal when a gaze direction of a driver of the vehicle is not within a first predetermined range based on a captured image of a head of the driver, a height determination step of determining that the state is abnormal when a height of an eye of the driver is not within a second predetermined range based on the captured image, and a position determination step of determining that the state is abnormal when a position of the head in a lateral direction is not within a third predetermined range based on the captured image;
an abnormal state determination step of determining that the state of the driver is abnormal when at least one of determination steps determines that the state has been abnormal continuously for a time equal to or longer than a continuation allowable time set for that determination step;

an information acquiring step of acquiring a surrounding situation of the vehicle; and a time correction step of correcting the continuation allowable time set for at least one of the determination steps according to the surrounding situation acquired by the information acquiring step, wherein one of the determination units is the position determination unit, and the third predetermined range is set within a range in which a center of gravity of the head is located in front of a headrest of a driver's seat in the vehicle, and the center of gravity of the head in the lateral direction is located between two position reference lines, which pass through the left and right ends of the headrest.

* * * * *